US 12,280,437 B2

(12) United States Patent
Matlik

(10) Patent No.: US 12,280,437 B2
(45) Date of Patent: Apr. 22, 2025

(54) CLAMPING DEVICE FOR TOOL HOLDER

(71) Applicant: AB SANDVIK COROMANT, Sandviken (SE)

(72) Inventor: Gunnar Matlik, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 405 days.

(21) Appl. No.: 17/778,330

(22) PCT Filed: Nov. 16, 2020

(86) PCT No.: PCT/EP2020/082169
§ 371 (c)(1),
(2) Date: May 19, 2022

(87) PCT Pub. No.: WO2021/099228
PCT Pub. Date: May 27, 2021

(65) Prior Publication Data
US 2023/0001493 A1 Jan. 5, 2023

(30) Foreign Application Priority Data

Nov. 20, 2019 (EP) ..................................... 19210457

(51) Int. Cl.
*B23B 31/26* (2006.01)
(52) U.S. Cl.
CPC ........ *B23B 31/265* (2013.01); *B23B 2231/12* (2013.01); *B23B 2260/034* (2013.01);
(Continued)

(58) Field of Classification Search
CPC ... B23B 29/046; B23B 31/261; B23B 31/265; B23B 2260/034; Y10T 409/309464
See application file for complete search history.

(56) References Cited

U.S. PATENT DOCUMENTS 4,915,553 A 4/1990 Lazarevic
5,549,427 A * 8/1996 Hiestand ............... B23B 31/302
409/233

(Continued)

FOREIGN PATENT DOCUMENTS

DE 4028775 C1 7/1991
EP 1468767 B1 12/2016
JP S5942234 A 3/1984

*Primary Examiner* — Eric A. Gates
*Assistant Examiner* — Reinaldo A Vargas Del Rio
(74) *Attorney, Agent, or Firm* — Corinne R. Gorski

(57) ABSTRACT

A clamping device for releasably holding a tool holder shank includes a spindle rotatably mounted inside a housing. A drawbar is axially moveable in a bore in the housing between an advanced releasing position and a retracted locking position. A plurality of engagement members are moveable under the effect of the drawbar into locking engagement with the tool holder shank. An actuating sleeve is arranged around a peripheral wall of the spindle and axially moveable in relation to it. A motion transferring mechanism is arranged for transferring an axial movement of the actuating sleeve into a movement of the drawbar. A hydraulic cylinder arrangement is arranged for moving the actuating sleeve. The hydraulic cylinder arrangement includes a cylinder casing fixed to spindle and an annular piston head, which is fixed to or fixedly connected to the actuating sleeve and slidably received in an annular space inside the cylinder casing.

11 Claims, 6 Drawing Sheets

(52) U.S. Cl.
CPC ............... *B23B 2270/025* (2013.01); *Y10T 409/309464* (2015.01)

(56) References Cited

U.S. PATENT DOCUMENTS

| | | | |
|---|---|---|---|
| 5,707,186 A * | 1/1998 | Gobell | B23B 31/302 |
| | | | 285/94 |
| 6,036,415 A * | 3/2000 | Sheehan | B23B 31/207 |
| | | | 409/231 |
| 2005/0002748 A1* | 1/2005 | Rehn | B23B 31/261 |
| | | | 409/233 |

* cited by examiner

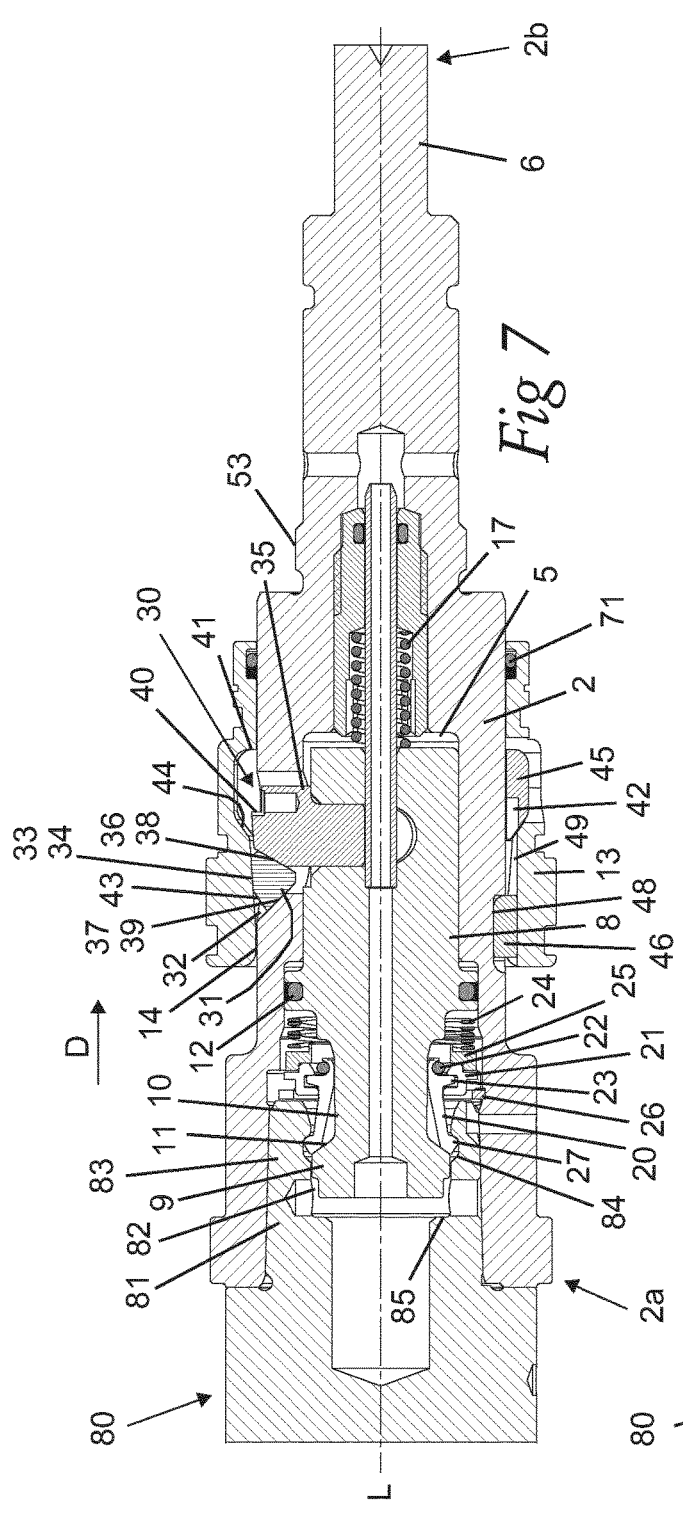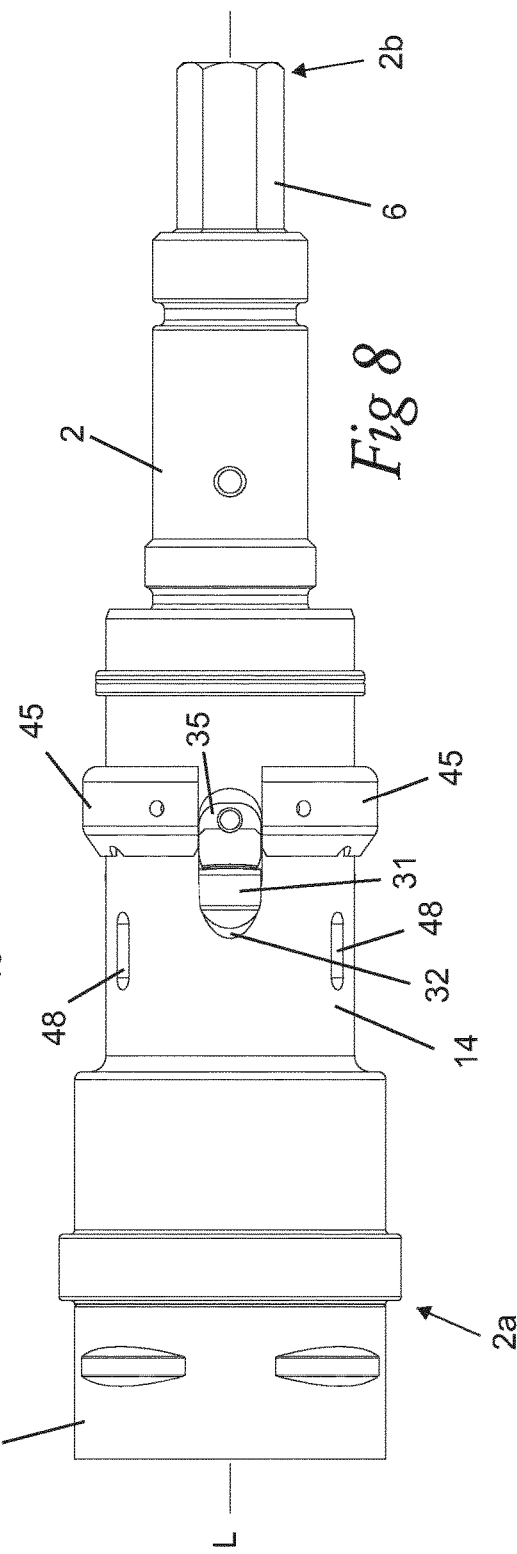

CLAMPING DEVICE FOR TOOL HOLDER

RELATED APPLICATION DATA

This application is a § 371 National Stage Application of PCT International Application No. PCT/EP2020/082169 filed Nov. 16, 2020 claiming priority to EP 19210457.8 filed Nov. 20, 2019.

FIELD OF THE INVENTION AND PRIOR ART

The present invention relates to a clamping device according to the preamble of claim 1, which is intended to be used for connecting a tool holder to a machine tool.

Within the field of machine tools for metal cutting, the cutting tools, for instance in the form of drills or milling tools, used for machining work pieces of metallic material are often fixed to and rotated together with a tool holder, which in its turn may be detachably clamped to a rotatable spindle of the machine tool in order to be rotated together with the spindle. It is previously know to clamp a shank of such a tool holder to a rotatable spindle by means of a clamping mechanism arranged in the spindle. When the cutting tool needs to be exchanged, the tool holder is released from the spindle and a new tool holder with another cutting tool is clamped to the spindle.

A clamping device comprising a spindle with a clamping mechanism adapted for an automatic tool changing operation is previously known from EP 1 468 767 B1. In the clamping device according to EP 1 468 767 B1, an actuating member in the form of a first drawbar is slidably mounted inside the spindle and configured to effect an axial displacement of a second drawbar via a force amplifying mechanism comprising a number of co-operating wedges arranged between the drawbars. A gas spring inside the spindle is configured to urge the two drawbars into a retracted locking position, in which a tool holder is clamped to the spindle, and a hydraulic piston may be configured to act on a piston at the rear end of the gas spring in order to achieve a displacement of the two drawbars into an advanced releasing position, in which the tool holder may be released from the spindle. However, this previously known clamping device has a relatively long axial extent and it is therefore not suitable to use this type of clamping device when tool holders are to be detachably fixed at the periphery of a tool turret where the available axial space for the clamping device is limited.

OBJECT OF THE INVENTION

The object of the present invention is to provide a clamping device of the above-mentioned type that has a new and favourable design and that is suitable for use with a tool turret of a machine tool.

SUMMARY OF THE INVENTION

According to the invention, said object is achieved by means of a clamping device having the features defined in claim 1.

The clamping device according to the invention comprises:
- a housing;
- a spindle rotatably mounted inside the housing and having a front end, a rear end and a bore which intersects the front end and extends rearwardly therefrom, wherein a mounting portion for receiving the tool holder shank is provided at a front end of the bore;
- a drawbar slidably mounted inside the bore so as to be reciprocally moveable in the bore along a longitudinal axis thereof between an advanced releasing position and a retracted locking position;
- engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the spindle,
- a hydraulically operated actuating sleeve arranged inside the housing, wherein the actuating sleeve is arranged around a peripheral wall of the spindle and slidably mounted to this peripheral wall so as to be axially moveable in relation to the spindle;
- a motion transferring mechanism arranged inside the housing, wherein the motion transferring mechanism is mounted to the spindle and configured to transfer an axial movement of the actuating sleeve in a first axial direction in relation to the spindle into a movement of the drawbar from the advanced releasing position to the retracted locking position; and
- a hydraulic cylinder arrangement arranged inside the housing and configured to move the actuating sleeve axially in relation to the spindle, wherein the hydraulic cylinder arrangement comprises a cylinder casing, which is concentric with the actuating sleeve and which is fixed to spindle on the outside thereof so as to be rotatable in relation to the housing together with the spindle, and an annular piston head, which is fixed to or fixedly connected to the actuating sleeve, the piston head being slidably received in an annular space inside the cylinder casing and configured to divide this space into an annular first hydraulic chamber on a first side of the piston head and an annular second hydraulic chamber on an opposite second side of the piston head.

The actuating sleeve is moveable together with the piston head in said first axial direction by feeding of hydraulic fluid into the first hydraulic chamber and in an opposite second axial direction by feeding of hydraulic fluid into the second hydraulic chamber. Thus, the drawbar is moveable into the retracted locking position under the effect of the piston head and the actuating sleeve by feeding of hydraulic fluid into the first hydraulic chamber within the cylinder casing.

By using the above-mentioned actuating sleeve for controlling the axial movement of the drawbar, no gas spring or the similar that takes up a lot of space in the axial direction is required for controlling the axial movement of the drawbar, which implies that the clamping device can be made compact in axial direction. The clamping device is therefore suitable for use in tool turrets.

Furthermore, the use of a hydraulically operated piston member for moving the actuating sleeve, and thereby achieving a movement of the drawbar, implies that the clamping device according to the invention is suitable for use in automatic tool changing operations.

The clamping device according to the present invention may be mounted to a tool turret of a machine tool, wherein the rotatable spindle of the clamping device is connected or connectable to a drive mechanism in the tool turret. However, the clamping device is not limited to use in a tool turret.

On the contrary, the rotatable spindle of the clamping device could constitute the main spindle of a machine tool or be connected to such a main spindle without any intermediate tool turret.

One embodiment of the invention is characterized in:
that the spindle and the cylinder casing form part of a rotatable unit that is rotatably received in an inner space of the housing;
that the first hydraulic chamber is hydraulically connected to a first hydraulic channel in the housing via an annular first hydraulic connecting area at the interface between the housing and said rotatable unit;
that the second hydraulic chamber is hydraulically connected to a second hydraulic channel in the housing via an annular second hydraulic connecting area at said interface; and
that rotary seals are arranged at said interface on either side of the first hydraulic connecting area and on either side of the second hydraulic connecting area.

The rotary seals prevent leakage of hydraulic fluid at the two hydraulic connections between the housing and the above-mentioned rotatable unit.

According to another embodiment of the invention, the actuating sleeve is configured to assume a self-locking axial position on the spindle when the drawbar has been forced into the retracted locking position under the effect of the actuating sleeve and the motion transferring mechanism, so as to thereby keep the drawbar in the retracted locking position. Hereby, the actuating sleeve is capable of keeping the drawbar in the retracted locking position during rotation of the spindle without requiring any external force from the hydraulic cylinder arrangement, which implies that the piston head only has to be subjected to hydraulic pressure in connection with a tool changing operation when the spindle and the other parts of the above-mentioned rotatable unit are in a stationary position. Thus, the hydraulic pressure on the piston head and thereby the hydraulic pressure on the above-mentioned rotary seals may be kept low, or even released, when the rotatable unit comprising the spindle and the cylinder casing is rotated. Hereby, the rotary seals do not have to be dimensioned to be capable of withstanding any higher hydraulic pressure during rotation of said rotatable unit, which in its turn makes it possible reduce the frictional forces caused by the rotary seals during rotation of the rotatable unit.

According to another embodiment of the invention, the piston head forms part of an annular piston member, which is secured to the actuating sleeve. Such an arrangement of the actuating sleeve and the piston member as two separate parts to be connected to each other may be favourable in order to facilitate the assembly of the clamping device. However, the piston head and the actuating sleeve may as an alternative be formed in one piece.

According to another embodiment of the invention, the cylinder casing is fixed to the spindle through a threaded joint formed by an internal thread on the cylinder casing and a corresponding external thread on the spindle. Hereby, the cylinder casing may be fixed to the spindle in a simple and reliable manner.

Another embodiment of the invention is characterized in:
that the motion transferring mechanism comprises two or more wedges spaced apart in the circumferential direction of the spindle, each wedge being received in a respective aperture that extends radially through said peripheral wall of the spindle, wherein the wedges are configured to press the drawbar towards the retracted locking position when they are pressed radially inwards in the associated apertures;
that each wedge comprises a first pressure receiving surface which faces outwards from the spindle;
that the actuating sleeve on its inner side is provided with a first pressure applying surface which faces inwards for contacting the first pressure receiving surface on each wedge, the first pressure applying surface having a radial distance to the longitudinal axis that increases as seen in said first axial direction; and
that the first pressure applying surface is configured to press each wedge radially inwards in the associated aperture by pressing against the first pressure receiving surface on each wedge when the actuating sleeve is moved in said first axial direction.

Since the first pressure applying surface has a radial distance to the longitudinal axis that increases in the first axial direction, a movement of the actuating sleeve in the first axial direction will cause a pressure to be applied by the first pressure applying surface on the first pressure receiving surface of each wedge. This pressure will have a component in the radial direction such that each wedge is pressed radially inwards towards the longitudinal axis.

According to another embodiment of the invention, the first pressure applying surface and the first pressure receiving surfaces are inclined in relation to the longitudinal axis by such an angle $\alpha$ that the wedges will keep the actuating sleeve in a self-locking axial position on the spindle when the drawbar has been forced into the retracted locking position under the effect of the actuating sleeve and the wedges. In this case, the first pressure applying surface and the first pressure receiving surface both extend in the same direction when viewed in a longitudinal section through the spindle. The angle $\alpha$ is chosen so as to be below a self-lock threshold angle, such that the actuating sleeve attains a self-locking axial position in relation to the wedges when the drawbar has been displaced inside the bore into the retracted locking position. To obtain a self-locking axial position, the angle $\alpha$ should be sufficiently small, i.e. below the self-lock threshold angle. A self-locking axial position refers to an axial position in which the static frictional force between the first pressure receiving surface of each wedge and the first pressure applying surface of the actuating sleeve is greater than the opposing force in the plane of friction that is caused by a force applied to the wedges in a radial direction perpendicular to the longitudinal axis. Hence, a self-locking axial position is obtained within an angular range that depends on the coefficient of friction between the first pressure receiving surface of each wedge and the first pressure applying surface of the actuating sleeve. This coefficient of friction depends on various parameters, such as the materials used, coatings on the surfaces, use of lubricants, etc. Hence, the self-lock threshold angle is dependent on such parameters. A person skilled in the art will be able to identify the self-lock threshold angle that apply in each specific case by using common general knowledge and/or routine experiments, or at least predict or assess whether a certain angle is below such a self-lock threshold angle. In general, it is preferred to choose an angle $\alpha$ that is well below the self-lock threshold angle, to thereby ensure a self-locking configuration. A further benefit of using a small angle $\alpha$ is that a force-amplifying effect is achieved, owing to the fact that a small angle $\alpha$ implies that a relatively long axial displacement of the actuating sleeve will result in a relatively short axial displacement of the drawbar. However, a too small angle $\alpha$ may be inefficient and not practically well-functioning. For example, a very small angle $\alpha$ may render it difficult to release the actuating sleeve from the self-locking axial position. The angle α is with advantage between 2° and 10°. With an angle α within this range, a self-locking effect as well as an appropriate force-amplifying effect may be achieved.

Another embodiment of the invention is characterized in:
that each wedge comprises a second pressure receiving surface which faces outwards from the spindle;
that the actuating sleeve on its inner side is provided with a second pressure applying surface which faces inwards for contacting the second pressure receiving surface on each wedge, the second pressure applying surface having a radial distance to the longitudinal axis that increases as seen in said first axial direction;
that the second pressure applying surface and the second pressure receiving surfaces are inclined in relation to the longitudinal axis by an angle β which is larger than the angle α; and
that the first and second pressure applying surfaces and the first and second pressure receiving surfaces are arranged consecutively on the actuating sleeve and on each wedge, respectively, such that, upon a movement of the actuating sleeve in the first axial direction, the second pressure applying surface is configured to slide and press against the second pressure receiving surface on each wedge during a first phase of the movement and the first pressure applying surface is configured to slide and press against the first pressure receiving surface on each wedge during a subsequent second phase of the movement. Hereby, the drawbar may be quickly moved in axial direction during the initial phase of the clamping under the effect of the larger angle β. This initial clamping phase does not require much force. However, during the final phase of the clamping, a great force is required for displacing the drawbar a short distance. When the actual clamping occurs, i.e. when the engagement members assume the above-mentioned first position, the drawbar is moved in axial direction under the effect of the smaller angle α such that the axial movement of the drawbar will be small as compared to the axial movement of the actuating sleeve, which results in a force-amplifying effect, also referred to as "power boost". The angle β is suitably between 10° and 75°, preferably between 35° and 65°, which provides an efficient initial axial movement of the drawbar. By using a steep angle β for the initial axial movement of the drawbar and a small angle α for the actual clamping, the actuating sleeve (and thus the entire clamping device) can be made relatively short in the axial direction while still providing a self-locking clamping mechanism with a significant force-amplifying effect.

According to another embodiment of the invention, the drawbar is, under the effect of the actuating sleeve and the motion transferring mechanism, moveable from the advanced releasing position to the retracted locking position against the action of a spring force from a release spring arranged inside the spindle. Thus, the release spring is configured to move the drawbar towards the advanced releasing position when the actuating sleeve is moved in a second axial direction opposite to the first axial direction. The release spring may ensure that the drawbar is pushed towards advanced releasing position immediately when the actuating sleeve is moved in said second axial direction. The release spring may also ensure that the different components of the motion transferring mechanism are always maintained under a certain axial pressure and thereby are kept in close contact with each other and in proper positions in relation to each other and in relation to the actuating sleeve and the drawbar.

Further advantageous features of the clamping device according to the present invention will appear from the description following below and the dependent claims.

BRIEF DESCRIPTION OF THE DRAWINGS

With reference to the appended drawings, a specific description of embodiments of the invention cited as examples follows below. In the drawings:

FIG. 7 is a longitudinal section through the tool holder and the parts of the clamping device shown in FIG. 5, with the tool holder clamped to the spindle, FIG. 8 is a planar view from above of the tool holder and the parts of the clamping device shown in FIG. 5, but with the actuating sleeve removed from the spindle.

DETAILED DESCRIPTION OF EMBODIMENTS OF THE INVENTION

Figure 1:
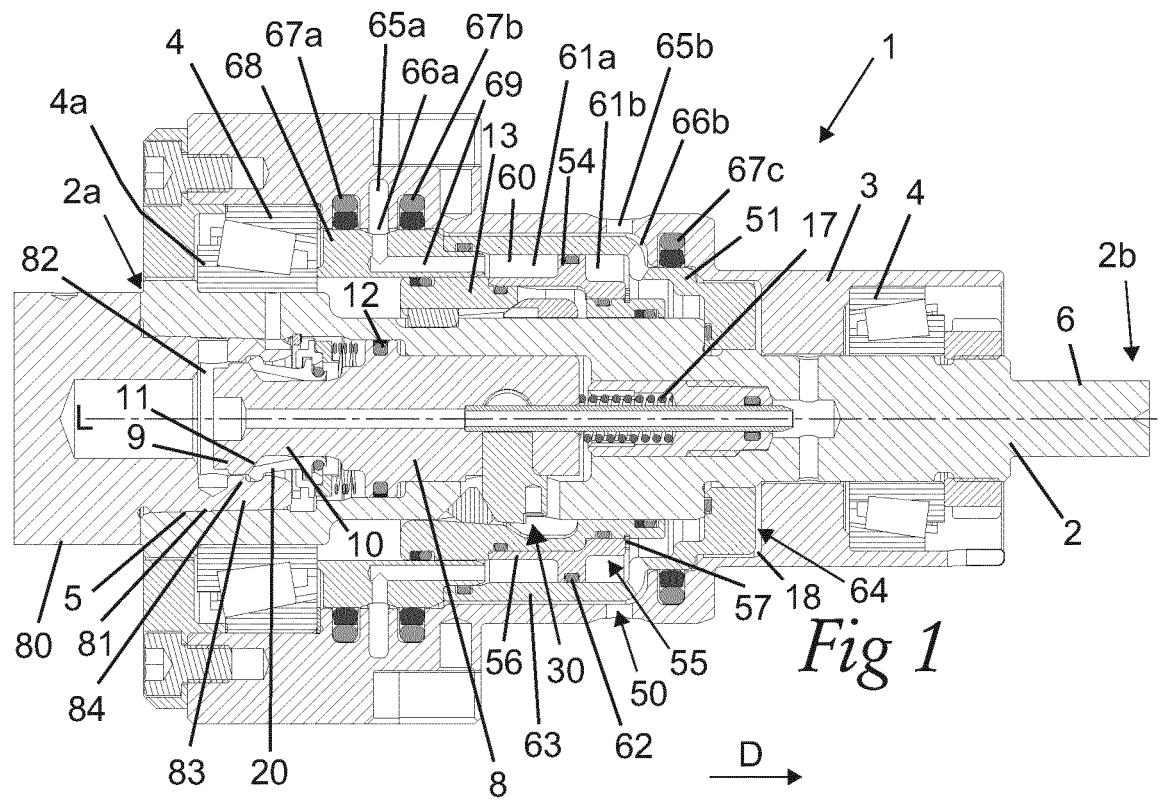
FIG. 1 is a longitudinal section through a clamping device according to an embodiment of the present invention and a tool holder, with the drawbar of the clamping device shown in a retracted locking position.
Figure 2:
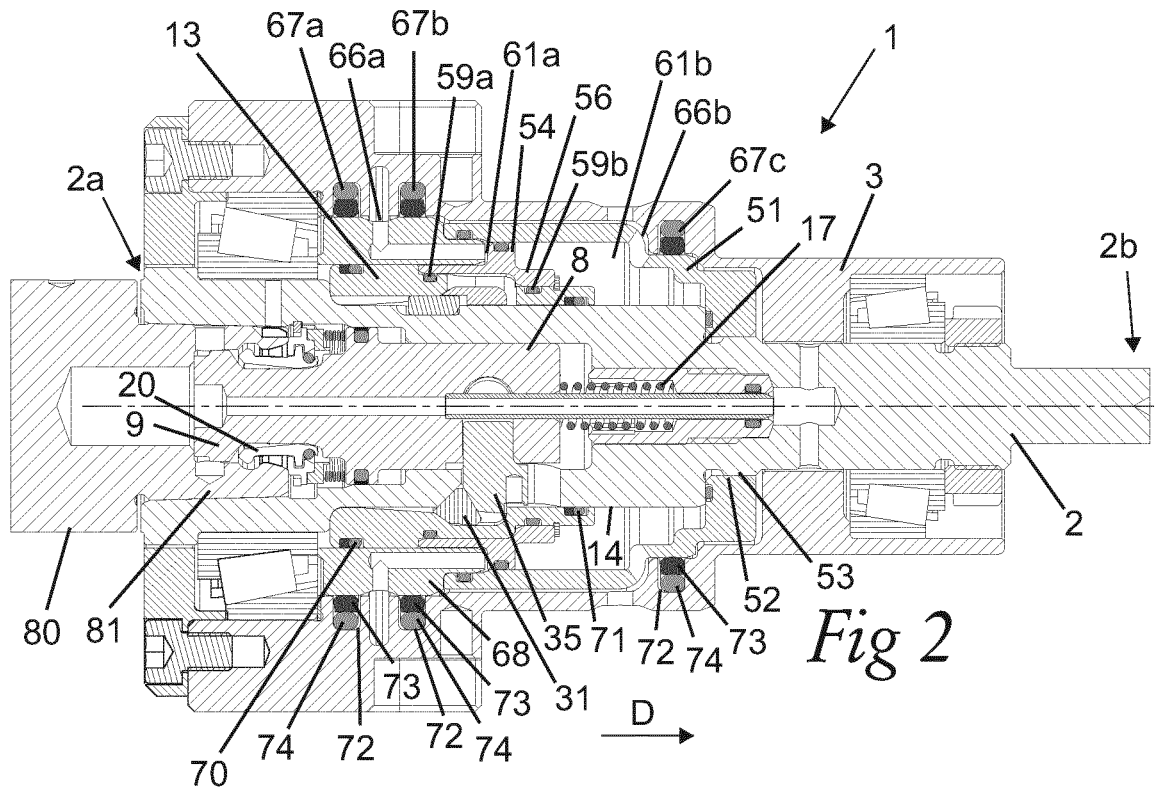
FIG. 2 is a longitudinal section corresponding to FIG. 1, with the drawbar shown in an advanced releasing position.
Figure 3:
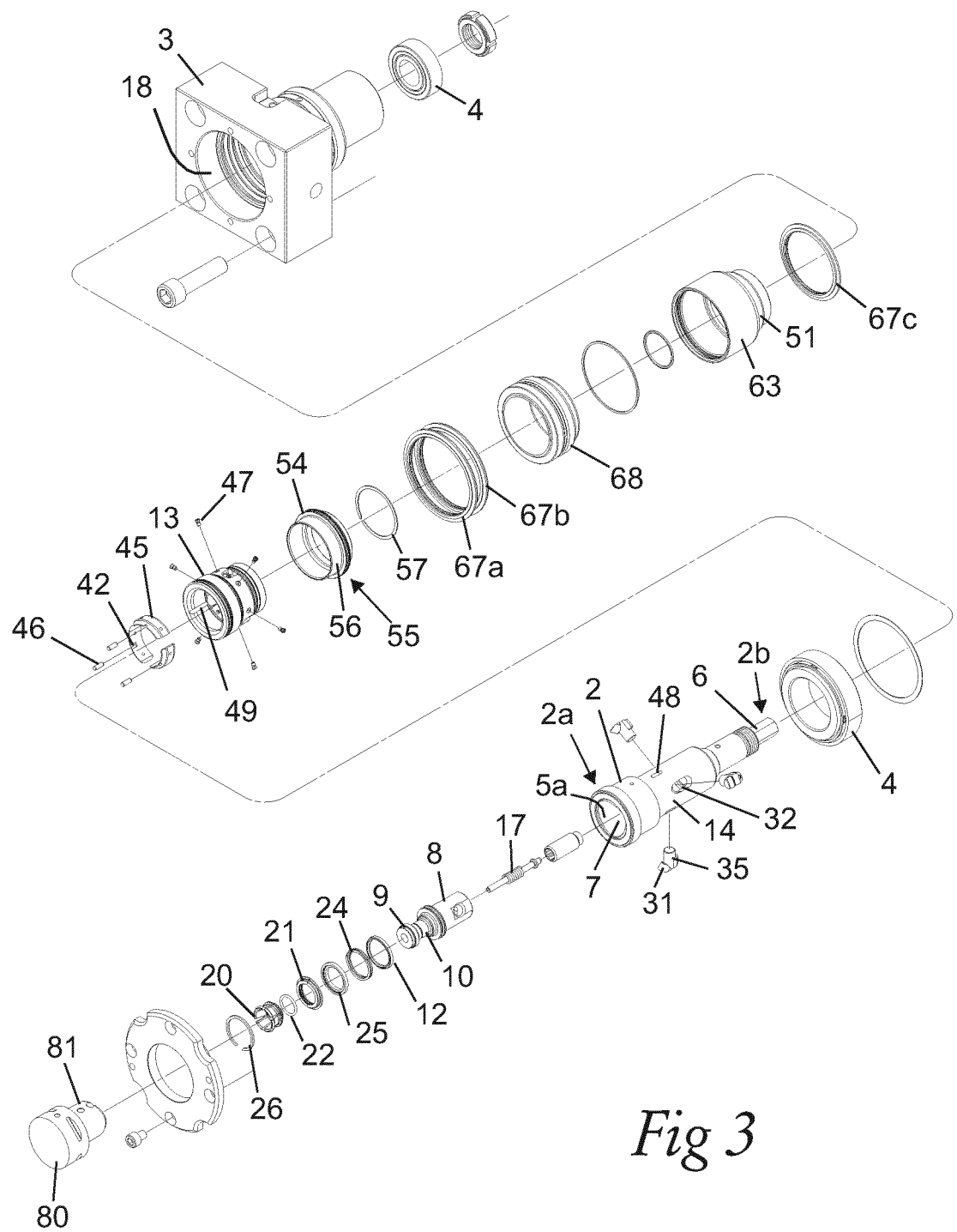
FIG. 3 is an exploded view of the clamping device and tool holder of FIG. 1.
Figure 4:
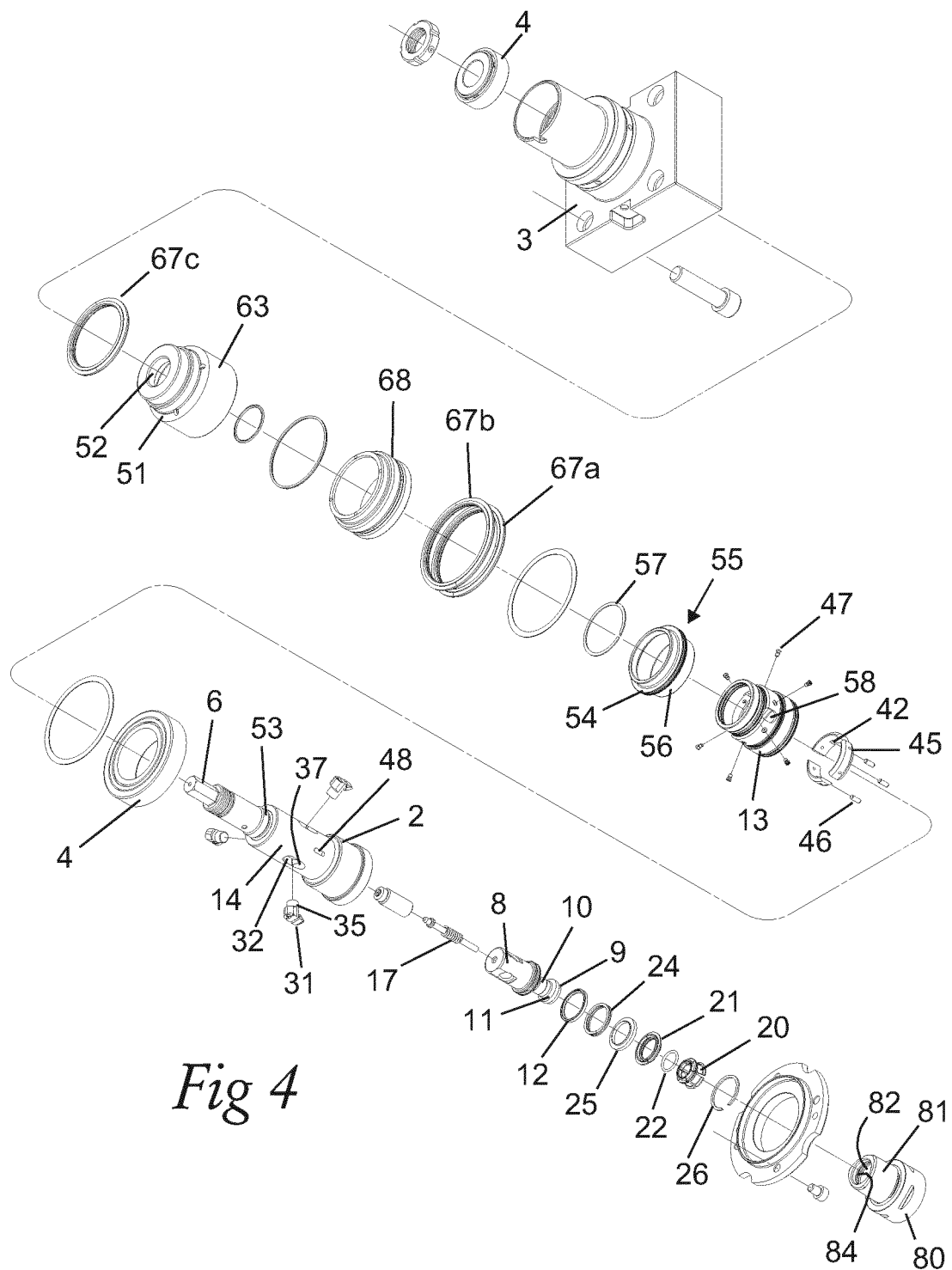
FIG. 4 is an exploded view from another direction of the clamping device and tool holder of FIG. 1.
Figure 5:
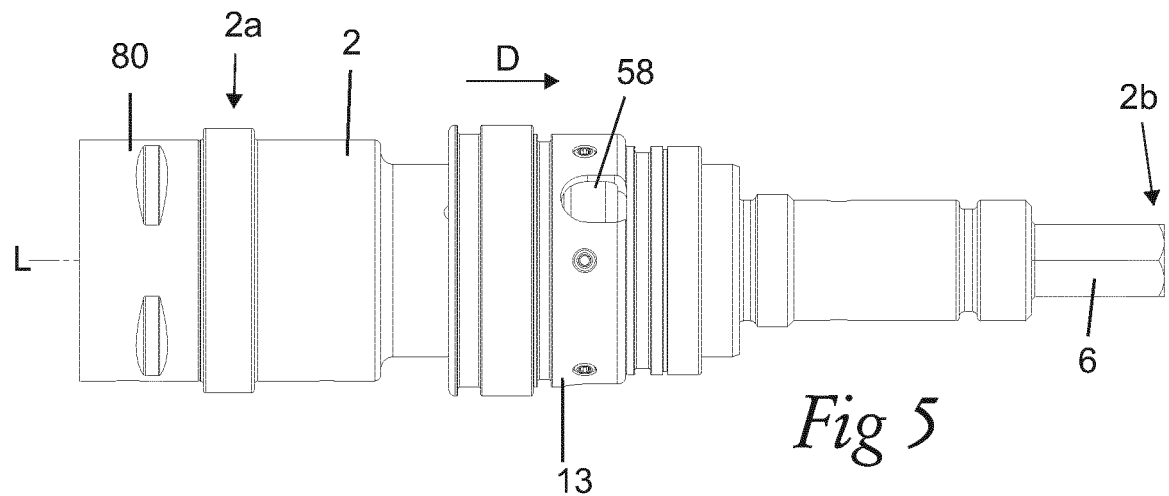
FIG. 5 is a lateral view of a parts included in the clamping device of FIG. 1, with a tool holder clamped to the spindle of the clamping device.
Figure 6:
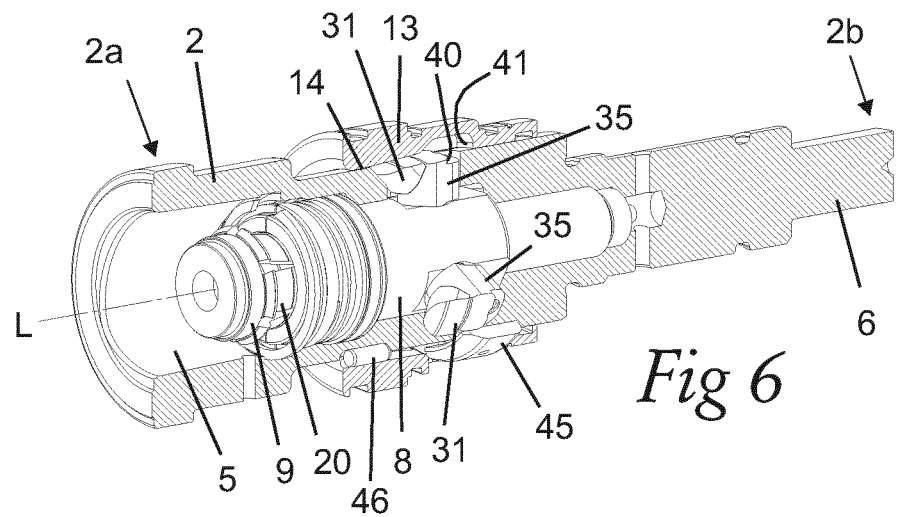
FIG. 6 is a partly cut perspective view of the parts of the clamping device shown in FIG. 5.

A clamping device 1 according to an embodiment of the present invention is illustrated in FIGS. 1 and 2 in a longitudinal section through the longitudinal axis thereof. The clamping device 1 is configured to releasably clamp a tool holder 80 (very schematically illustrated in the drawings) to a rotatable spindle 2 in the clamping device and enable the machining of a work piece by means of a cutting tool (not shown) fixed to the tool holder 80.

Figure 9:
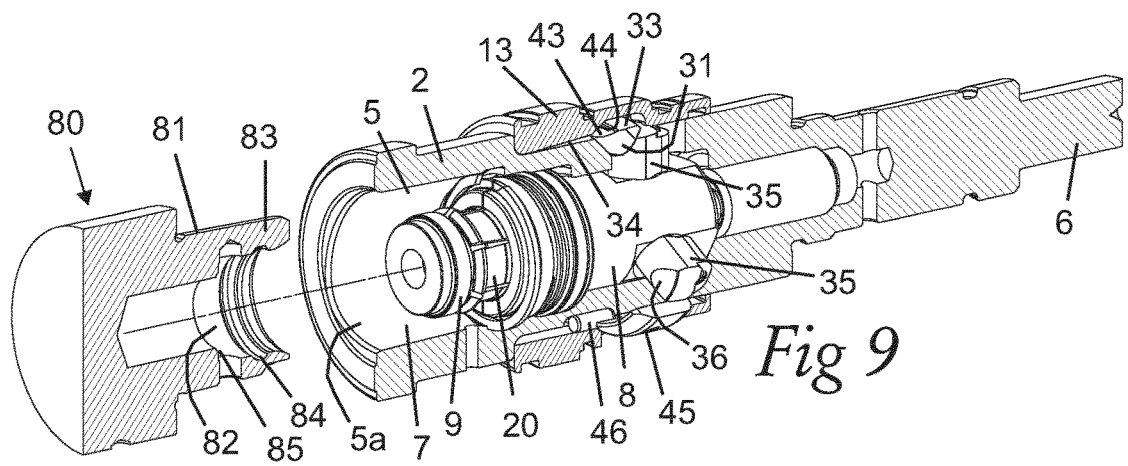
FIG. 9 is a partly cut perspective view of the tool holder and the parts of the clamping device shown in FIG. 5, with the tool holder detached from the spindle.
Figure 10:
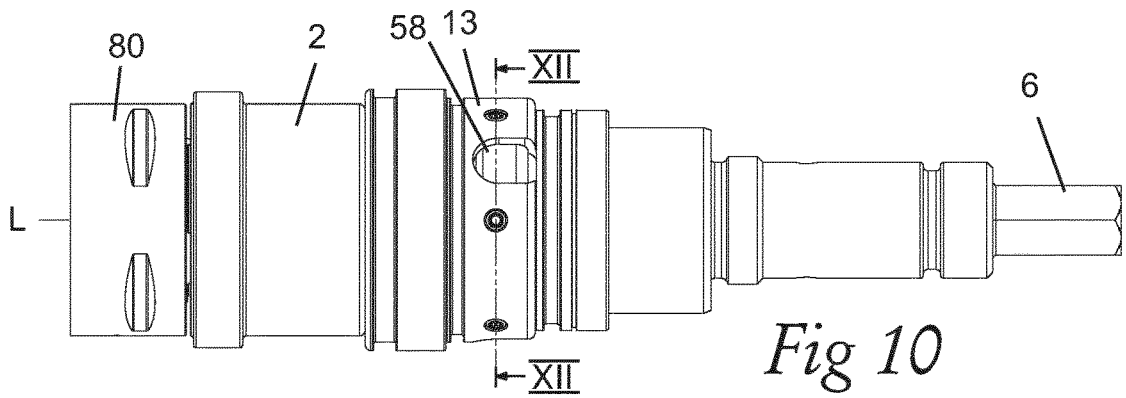
FIG. 10 is a lateral view of the tool holder and the parts of the clamping device shown in FIG. 5, with the tool holder in an unclamped state.

The spindle 2 is rotatably mounted to a housing 3 of the clamping device 1 by means of rolling bearings 4, for instance in the form of tapered roller bearings or any other suitable type of roller bearings. The spindle 2 has a front end 2a, a rear end 2b and a bore 5 which intersects the front end 2a and extends rearwardly therefrom. Thus, the bore 5 has an entrance opening 5a (see FIG. 9) at the front end 2a of the spindle. The spindle 2 is connectable to a drive mechanism of a machine tool, for instance a drive mechanism in a tool turret of a machine tool, via a connection pin 6 at the rear end 2b of the spindle in order to allow the spindle to be driven in rotation by the drive mechanism.

A mounting portion 7 (see FIG. 9) for receiving a mounting shank 81 on the tool holder 80 is provided at a front end of the bore 5. This mounting shank 81 is here referred to as tool holder shank.

A drawbar 8 is slidably mounted inside the bore 5 so as to be reciprocally moveable in the bore 5 along a longitudinal axis L thereof between an advanced releasing position (see FIGS. 2 and 11) and a retracted locking position (see FIGS. 1 and 7). The drawbar 8 has a front end facing the entrance opening 5a of the bore 5 and an opposite rear end. A head portion 9 and a neck portion 10 are provided at the front end of the drawbar 8. The head portion 9 is located in front of the neck portion 10 as seen in the longitudinal direction of the drawbar, wherein the head portion 9 is connected to the neck portion 10 via a rearwardly facing bevelled surface 11 on the head portion 9. A sealing ring 12 is arranged between the drawbar 8 and an inner surface of the bore 5. In the illustrated example, this sealing ring 12 is received in a groove on the outer side of the drawbar 8.

The tool holder shank 81 is insertable into the mounting portion of the bore 5 via the entrance opening 5a at the front end 2a of the spindle 2. The head portion 9 of the drawbar is received in an engagement bore 82 in the tool holder shank 81 and a tubular wall 83 of the tool holder shank is received in a space between the head portion 9 and an inner surface of the bore 5. In the illustrated embodiment, the mounting portion 7 of the bore 5 is conically shaped and has a somewhat "triangular" or polygonal, non-circular cross-sectional shape adapted to receive a similarly shaped tool holder shank 81. The conical shape ensures a connection free from play in the radial as well as the axial direction between the tool holder shank 81 and the spindle 2, whereas the non-circular cross-section ensures a non-rotatable fixation of the tool holder shank 81 to the spindle 2. However, the mounting portion of the bore 5 could also have any other suitable shape for receiving other types of tool holder shanks.

Engagement members 20 in the form of segments are arranged around the drawbar 8 at a front end thereof. Under the effect of a movement of the drawbar 8 from the advanced releasing position to the retracted locking position, the engagement members 20 are moveable from a first position (see FIGS. 2 and 11), in which the engagement members 20 allow the tool holder shank 81 to move into and out of the mounting portion of the bore 5, to a second position (see FIGS. 1 and 7), in which the engagement members 20 are in locking engagement with an engagement groove 84 in the engagement bore 82 in the tool holder shank 81 and thereby keep the tool holder shank 81 secured to the spindle 2.

In the illustrated embodiment, the engagement members 20 are arranged around the neck portion 10 of the drawbar 8 and held in place around the neck portion by means of a retainer ring 21 (see FIG. 7) and an elastic O-ring 22, which are arranged in the bore 5 and surround the neck portion 10. Each engagement member 20 has an outwardly facing flange portion 23 engaged in an inner groove in the retainer ring 21. The O-ring 22 is received in an outwardly facing groove at the rear end of each engagement member 20. A compression spring 24, a thrust ring 25 and a stop ring 26 are also arranged in the bore 5 and configured to surround the drawbar 8. The compression spring 24 is mounted between a shoulder on the drawbar 8 and the thrust ring 25 and it is configured to urge the thrust ring 25, the retainer ring 21 and the engagement members 20 forwards. The forward movement of the retainer ring 21 towards the entrance opening of the bore 5 is limited by the stop ring 26, which is mounted in a groove in an inner surface of the bore 5.

Figure 11:
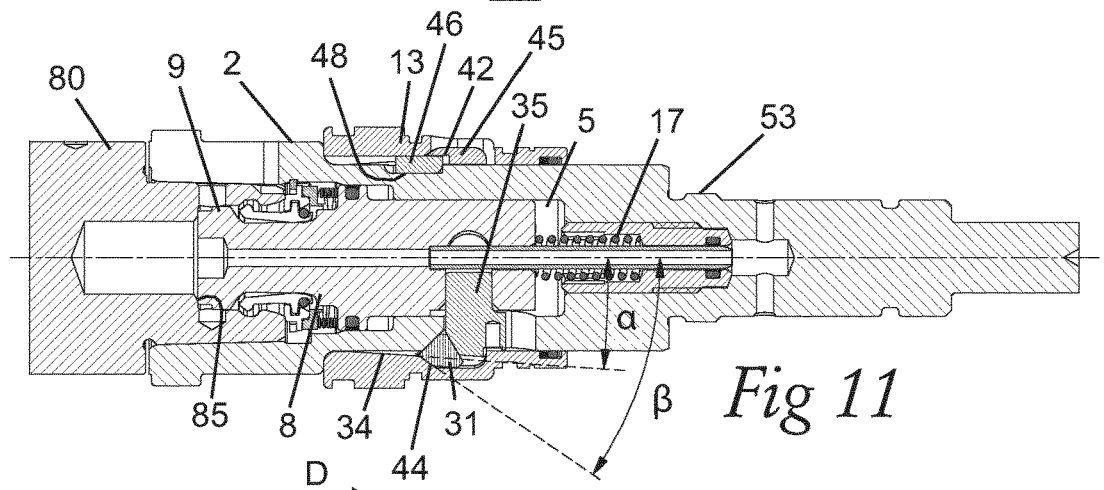
FIG. 11 is a longitudinal section through the tool holder and the parts of the clamping device shown in FIG. 5, with the tool holder in an unclamped state.

At its front end, each engagement member 20 is provided with an outwardly directed engagement flange 27, which is configured to be in engagement with the engagement groove 84 in the tool holder shank 81 when the engagement member 20 is in the above-mentioned second position. When the drawbar 8 is in the advanced releasing position, the front ends of the engagement members 20 are located behind the head portion 9 of the drawbar 8 and the engagement flanges 27 are out of engagement with the engagement groove 84 in the tool holder shank 81, as illustrated in FIGS. 2 and 11. When the drawbar 8 is moved axially rearwards in the bore 5 along the longitudinal axis L thereof, the bevelled surface 11 on the head portion 9 of the drawbar will come into contact with the front ends of the engagement members 20, wherein the front ends of the engagement members 20 will slide on this bevelled surface 11 and be pressed outwards so that the engagement flanges 27 on the engagement members come into engagement with the engagement groove 84 in the tool holder shank 81, whereupon the tool holder shank 81 will be pulled by the drawbar 8 into firm contact with inner surfaces of the spindle 2 within the mounting portion of the bore 5.

The clamping device 1 further comprises an actuating sleeve 13, which is concentric with the spindle 2 and arranged around a peripheral wall 14 of the spindle 2. The actuating sleeve 13 is slidably mounted to this peripheral wall 14 so as to be axially moveable in relation to the spindle 2 along the longitudinal axis L. The actuating sleeve 13 is non-rotatably mounted to the spindle 2, i.e. prevented from rotating in relation to the spindle 2, and consequently configured to rotate together with the spindle 2. A motion transferring mechanism 30 is mounted to the spindle 2 and configured to transfer an axial movement of the actuating sleeve 13 in a first axial direction D in relation to the spindle 2 into a movement of the drawbar 8 from the advanced releasing position to the retracted locking position. In the illustrated embodiment, this first axial direction D is a direction towards the rear end 2b of the spindle 2. Thus, in this case a movement of the drawbar 8 from the advanced releasing position to the retracted locking position is effected by an axial movement of the actuating sleeve 13 rearwards along the spindle 2. However, as an alternative, the actuating sleeve 13 and the motion transferring mechanism 30 could be arranged to co-operate in such a manner that a movement of the drawbar 8 from the advanced releasing position to the retracted locking position is effected by an axial movement of the actuating sleeve 13 forwards along the spindle 2.

Furthermore, the clamping device 1 comprises a hydraulic cylinder arrangement 50 for moving the actuating sleeve 13 axially in relation to the spindle 2. This hydraulic cylinder arrangement 50 comprises a cylinder casing 51, which is concentric with the actuating sleeve 13 and which is fixed to spindle 2 on the outside thereof so as to be rotatable in relation to the housing 3 together with the spindle 2. In the illustrated embodiment, the cylinder casing 51 is fixed to the spindle 2 through a threaded joint formed by an internal thread 52 on the cylinder casing 51 and a corresponding external thread 53 on the spindle 2. However, the cylinder casing 51 may of course be fixed to the spindle 2 in any other suitable manner.

The hydraulic cylinder arrangement 50 also comprises an annular piston head 54, which is fixed to or fixedly connected to the actuating sleeve 13. In the illustrated embodiment, the piston head 54 forms part of an annular piston member 55, which is concentric with the actuating sleeve 13 and configured to surround a part of it. This piston member 55 comprises a sleeve-shaped base part 56, which is secured to the actuating sleeve 13 on the outside thereof. The base part 56 is fixed to the actuating sleeve 13 by means of a lock ring 57, which is received in an annular groove on the outer side of the actuating sleeve and which prevents the actuating sleeve 13 and the piston member 55 from moving axially in relation to each other. In this case, the piston head 54 is formed as an annular external protuberance on the piston member 55. In the illustrated embodiment, the base part 56 of the piston member 55 covers radial through holes 58 in the actuating sleeve 13, wherein these through holes 58 give access to the spindle 2 and the drawbar 8 for insertion of different components of the motion transferring mechanism 30 during the assembling of the clamping device 1. Sealing rings 59a, 59b are arranged between the actuating sleeve 13 and the base part 56 of the piston member on opposite sides of the through holes 58.

The piston head 54 and the actuating sleeve 13 may as an alternative be formed in one piece, for instance with the piston head formed as an annular external protuberance on the actuating sleeve.

The piston head 54 is slidably received in an annular space 60 inside the cylinder casing 51 and configured to divide this space into an annular first hydraulic chamber 61a on a first side of the piston head 54 and an annular second hydraulic chamber 61b on an opposite second side of the piston head. The actuating sleeve 13 is moveable together with the piston head 54 in the above-mentioned first axial direction D by feeding of hydraulic fluid into the first hydraulic chamber 61a in order to effect a movement of the drawbar 8 from the advanced releasing position to the retracted locking position, and the actuating sleeve 13 is moveable together with the piston head 54 in an opposite second axial direction by feeding of hydraulic fluid into the second hydraulic chamber 61b. A sealing ring 62 is mounted in an annular groove in an outwardly facing surface on the piston head 54 so as to be in sealing contact with a wall 63 of the cylinder casing 51 that delimits the above-mentioned space 60 in radial direction outwards.

The actuating sleeve 13 is preferably configured to assume a self-locking axial position on the spindle 2 when the drawbar 8 has been forced into the retracted locking position under the effect of the actuating sleeve 13 and the motion transferring mechanism 30, so as to thereby allow the actuating sleeve 13 to keep the drawbar 8 in the retracted locking position. Hereby, the piston head 54 only needs to be subjected to hydraulic pressure in connection with a tool changing operation when the spindle 2 is stationary and the drawbar 8 is to be moved from the retracted locking position to the advanced releasing position and then back to the retracted locking position. In the self-locking axial position, frictional forces between the actuating sleeve 13 and parts of the motion transferring mechanism 30 and/or the spindle 2 that are in contact with the actuating sleeve 13 prevent the actuating sleeve from being axially displaced in a direction opposite to the first axial direction D.

The spindle 2 and the cylinder casing 51 form part of a rotatable unit 64 that is rotatably received in an inner space 18 of the housing 3. This rotatable unit 64 also comprises the other components that are mounted to and configured to rotate together with the spindle 2, such as the actuating sleeve 13, the drawbar 8, the piston member 55 and the motion transferring mechanism 30. The first hydraulic chamber 61a is hydraulically connected to a first hydraulic channel 65a in the housing 3 via an annular first hydraulic connecting area 66a at the interface between the housing 3 and said rotatable unit 64, and the second hydraulic chamber 61b is hydraulically connected to a second hydraulic channel 65b in the housing 3 via an annular second hydraulic connecting area 66b at said interface. Rotary seals 67a, 67b, 67c are arranged at said interface on either side of the first hydraulic connecting area 66a and on either side of the second hydraulic connecting area 66b. In the illustrated example, said rotary seals are three in number, wherein one 67b of them is arranged between the first and second hydraulic connecting areas 66a, 66b.

In the illustrated embodiment, the above-mentioned rotatable unit 64 also comprises a sleeve-shaped connecting piece 68, which is clamped between a front end of the cylinder casing 51 and an inner part 4a of a rolling bearing 4 provided between the spindle 2 and the housing 3 at the front end 2a of the spindle. In this case, the first hydraulic chamber 61a is connected to the first hydraulic connecting areas 66a through channels 69 provided in the connecting piece 68. There is a small play between the outer surfaces of the cylinder casing 51 and the connecting piece 68 and the opposed inner surfaces of the housing 3.

A cylindrical outer surface of the actuating sleeve 13 at a front end thereof, i.e. at the end of the actuating sleeve that faces towards the front end 2a of the spindle 2, is in sliding contact with a cylindrical inner surface of the connecting piece 68. A sealing ring 70 is mounted in an annular groove in said cylindrical outer surface on the actuating sleeve so as to be in sealing contact with the opposed inner surface of the connecting piece 68. Another sealing ring 71 is mounted in an annular groove in a cylindrical inner surface of the actuating sleeve 13 at a rear end thereof, i.e. at the end of the actuating sleeve that faces towards the rear end 2b of the spindle 2, wherein this sealing ring 71 is in sealing contact with the opposed peripheral wall 14 of the spindle 2.

Each rotary seal 67a, 67b, 67c is preferably arranged in a respective annular groove 72 provided in an inner surface of the housing 3 at the above-mentioned interface. However, each rotary seal 67a, 67b, 67c could as an alternative be arranged in a respective annular groove provided in an outer surface of the rotatable unit 64. In the illustrated embodiment, each rotary seal 67a, 67b, 67c comprises an inner seal ring 73 and an outer elastomeric O-ring 74, which surrounds the seal ring 73 and which is in a radially compressed state and configured to press the seal ring 73 against an outer surface of said rotatable unit 64.

In the illustrated embodiments, a release spring 17, preferably in the form of a helical compression spring, is mounted in a space inside the spindle 2 and configured to act on the rear end of the drawbar 8 in order to urge the drawbar towards the advanced releasing position. The drawbar 8 is moveable, under the effect of the actuating sleeve 13 and the motion transferring mechanism 30, from the advanced releasing position to the retracted locking position against the action of a spring force from this release spring 17. The release spring 17 is with advantage arranged along the longitudinal axis L, behind the drawbar 8.

The motion transferring mechanism 30 may be designed in many different manners. In the illustrated embodiment, the motion transferring mechanism comprises three wedges 31, which are spaced apart in the circumferential direction of the spindle 2. Each wedge 31 is received in a respective aperture 32 that extends radially through the above-mentioned peripheral wall 14 of the spindle 2, wherein the wedges 31 are configured to press the drawbar 8 towards the retracted locking position when they are pressed radially inwards in the associated apertures 32. Each wedge 31 comprises a first pressure receiving surface 33 (see FIGS. 7 and 9) which faces outwards from the spindle 2, and the actuating sleeve 13 is on its inner side provided with a first pressure applying surface 34 which faces inwards for contacting the first pressure receiving surface 33 on each wedge. The first pressure applying surface 34 has a radial distance to the longitudinal axis L that increases as seen in the above-mentioned first axial direction D. The first pressure applying surface 34 is configured to press the wedges 31 radially inwards in the apertures 32 by pressing against the first pressure receiving surface 33 on each wedge when the actuating sleeve 13 is moved in the first axial direction D.

The illustrated motion transferring mechanism 30 also comprises three wedge engagement members 35, which project radially from the drawbar 8 into a respective one of the apertures 32 and which are fixed to the drawbar so as to be moveable along the longitudinal axis L together with the drawbar. Thus, a movement of a wedge engagement member 35 along the longitudinal axis L will cause a corresponding movement of the drawbar 8. Each wedge engagement member 35 is in contact with one of the wedges 31. In order to facilitate the assembly of the clamping device 1, the illustrated wedge engagement members 35 are formed as separate elements mounted in a respective radial recess in the drawbar 8. However, the wedge engagement members 35 may as an alternative be mounted to the drawbar 8 in any other suitable manner or formed in one piece with the drawbar.

The motion transferring mechanism 30 may comprise any suitable number of wedges 31 and associated wedge engagement members 35 arranged to extend through a corresponding number of apertures 32 in the peripheral wall 14 of the spindle 2. The apertures 32 and the associated wedges 31 and wedge engagement members 35 are preferably evenly distributed in the circumferential direction of the peripheral wall 14.

Each wedge engagement member 35 has a slide surface 36 which faces towards the front end 2a of the spindle 2, and each aperture 32 has a slide surface 37 which faces towards the rear end 2b of the spindle. Furthermore, each wedge 31 has a first wedge surface 38 which faces towards the rear end 2b of the spindle and a second wedge surface 39 which faces towards the front end 2a of the spindle, wherein these first and second wedge surfaces 38, 39 approach each other in a radial direction towards the longitudinal axis L. The first wedge surface 38 of each wedge 31 is in contact with the slide surface 36 of the associated wedge engagement member 35 and the second wedge surface 39 of each wedge is in contact with the slide surface 37 of the associated aperture 32. When the wedges 31 are pressed radially inwards in the apertures 32 by the actuating sleeve 13, the first and second wedge surfaces 38, 39 of each wedge 31 will slide and press against the corresponding slide surfaces 36, 37 of the associated wedge engagement member 35 and aperture 32 and thereby force the drawbar 8 to move towards the retracted locking position.

The first pressure applying surface 34 and the first pressure receiving surfaces 33 are preferably inclined in relation to the longitudinal axis L by such an angle $\alpha$ (see FIG. 11) that the wedges 31 will keep the actuating sleeve 13 in a self-locking axial position on the spindle 2 when the drawbar 8 has been forced into the retracted locking position under the effect of the actuating sleeve 13 and the wedges 31.

Each wedge 31 may also comprise a second pressure receiving surface 43 which faces outwards from the spindle 2, wherein the actuating sleeve 13 on its inner side is provided with a second pressure applying surface 44 which faces inwards for contacting the second pressure receiving surface 43 on each wedge. The second pressure applying surface 44 has a radial distance to the longitudinal axis L that increases as seen in the first axial direction D. The second pressure applying surface 44 and the second pressure receiving surfaces 43 are inclined in relation to the longitudinal axis L by an angle $\beta$ (see FIG. 11) which is larger than the above-mentioned angle $\alpha$. The first and second pressure applying surfaces 34, 44 and the first and second pressure receiving surfaces 33, 43 are arranged consecutively on the actuating sleeve 13 and on each wedge 31, respectively, such that, upon a movement of the actuating sleeve 13 in the first axial direction D, the second pressure applying surface 44 is configured to slide and press against the second pressure receiving surface 43 on each wedge during an initial first phase of the movement, whereupon the first pressure applying surface 34 is configured to slide and press against the first pressure receiving surface 33 on each wedge during a subsequent second phase of the movement.

Each wedge engagement member 35 further comprises a release pressure receiving surface 40 which faces towards the rear end 2b of the spindle 2, and the actuating sleeve 13 comprises a release pressure applying surface 41 which faces towards the front end 2a of the spindle. The release pressure applying surface 41 of the actuating sleeve 13 is configured to come into contact with the release pressure receiving surfaces 40 of the wedge engagement members 35 when the actuating sleeve 13 is moved in the above-mentioned second axial direction, to thereby allow the actuating sleeve to exert a forwardly directed axial force on the drawbar 8 via the wedge engagement members 35 during a final phase of the movement of the drawbar from the retracted locking position to the advanced releasing position.

Figure 12:
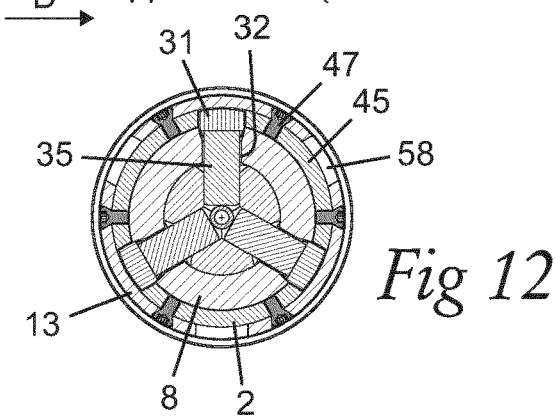
FIG. 12 is a cross-section according to the line XII-XII in FIG. 10.

In the illustrated embodiment, supporting segments 45 and pins 46 are arranged between the actuating sleeve 13 and the spindle 2. The supporting segments 45 are arranged on the inner side of the actuating sleeve 13 and are fixed to the actuating sleeve by means of screws 47, as illustrated in FIG. 12. The supporting segments 45 support the wedges 31 such that they are kept in place and are prevented from being dislocated with respect to the actuating sleeve 13 in the circumferential direction. Each pin 46 is accommodated partly in a recess 48 in the spindle 2 and partly in a longitudinal groove 49 in the actuating sleeve 13. The pins 46 are fixed in axial position in relation to the spindle 2 by being received in the recesses 48 on the outer side of the spindle. The pins 46 are slidably received in the longitudinal grooves 49 on the inner side of the actuating sleeve 13, and the actuating sleeve 13 is thereby allowed to move axially in relation to the pins 46 when the actuating sleeve is axially moved in relation to the spindle 2. When the actuating sleeve 13 is in the advanced releasing position, a rear end of each pin 46 is partly received in a recess 42 in a supporting segment 45, as illustrated in FIG. 11. The pins 46 prevent mutual rotation between the actuating sleeve 13 and the spindle 2. Consequently, when the spindle 2 is rotated, the actuating sleeve 13 will rotate together with the spindle 2 with the same rotational speed and cannot be displaced in relation to the spindle 2 in the circumferential direction.

When a tool holder 80 is to be clamped to the spindle 2, the tool holder shank 81 is inserted into the mounting portion 7 of the bore 5 with the spindle 2 kept in a stationary position and the drawbar 8 positioned in the advanced releasing position, as illustrated in FIGS. 2 and 11. Hereby, the head portion 9 of the drawbar is received in the engagement bore 82 in the tool holder shank 81 and the engagement groove 84 in the tool holder shank 81 is positioned on the outside of the engagement flanges 27 of the engagement members 20. Thereupon, hydraulic oil is fed into the first hydraulic chamber 61a in order to move the actuating sleeve 13 in the first axial direction D. During a first phase of this axial movement of the actuating sleeve 13, the second pressure applying surface 44 on the actuating sleeve 13 will slide and press against the second pressure receiving surfaces 43 on the wedges 31. Hereby, the wedges 31 will be pressed radially inwards and the drawbar 8 will be axially displaced towards the retracted locking position. Due to the relatively steep inclination β of the second pressure applying and receiving surfaces 44, 43, the wedges 31 will initially move inwards rather fast, which results in a relatively quick displacement of the drawbar 8. The relatively steep angle β is advantageous since the initial displacement of the drawbar 8 does not require much force. The first and second pressure applying surfaces 34, 44 and the first and second pressure receiving surfaces 33, 43 are so arranged that when the actuating sleeve 13 has been moved such a distance that the second pressure applying surface 44 has passed the second pressure receiving surface 43 and the first pressure applying surface 34 reaches the first pressure receiving surface 33, i.e. at the transition between these respective surfaces, the drawbar 8 has almost reached its final destination at the rear end of the bore 5. Hence, for the final clamping phase, in which a large force is beneficial, the first pressure applying and receiving surfaces 34, 33 are active. In this phase, a relatively large movement of the actuating sleeve 13 will result in a very small radial displacement of the wedges 31, and an even smaller axial displacement of the drawbar 8, which consequently will provide a force amplifying effect that will make it possible for the drawbar 8 to pull the tool holder shank 81 with a large force into firm engagement with the spindle 2. Furthermore, the small inclination α of the first pressure applying and receiving surfaces 34, 33 will provide a self-locking effect and make sure that the clamping device will remain in the clamped state without requiring any additional locking means. Hereby, the hydraulic pressure on the piston head 54 may be released when the drawbar 8 has reached the retracted locking position.

When a tool changing operation is to be performed and the tool holder 80 is to be released from the spindle 2, the rotation of the spindle 2 is stopped and hydraulic oil is fed into the second hydraulic chamber 61b in order to move the actuating sleeve 13 in the second axial direction, opposite to the first axial direction D. When the actuating sleeve 13 is subjected to a sufficient force in said second axial direction by the hydraulic pressure in the second hydraulic chamber 61b, the self-locking frictional engagement between the first pressure applying surface 34 on the actuating sleeve 13 and the first pressure receiving surfaces 33 on the wedges 31 will be released, whereupon the actuating sleeve 13 is moveable in relation to the spindle 2 in the second axial direction under the effect of the hydraulic pressure in the second hydraulic chamber 61b. When the actuating sleeve 13 is moved in this direction, the spring force exerted by the release spring 17 on the rear end of the drawbar 8 will push the drawbar axially towards the advanced releasing position. Hereby, the wedge engagement members 35 will exert a force on the wedges 31 and press them radially outwards. When the actuating sleeve 13 has been moved a certain distance in the second axial direction, the release pressure applying surface 41 on the actuating sleeve 13 will come into contact with the release pressure receiving surfaces 40 on the wedge engagement members 35, which will allow the actuating sleeve 13 to exert an axial force on the drawbar 8 via the wedge engagement members 35 that will push the outer end of the head portion 9 of the drawbar 8 against a surface 85 in the engagement bore 82 in the tool holder shank 81 and thereby release the tool holder shank 81 from the spindle 2.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A clamping device arranged for releasably holding a tool holder shank, the clamping device comprising:
   a housing;
   a spindle rotatably mounted inside the housing and having a front end, a rear end and a bore which intersects the front end and extends rearwardly therefrom, wherein a mounting portion for receiving the tool holder shank is provided at a front end of the bore;
   a drawbar slidably mounted inside the bore so as to be reciprocally moveable in the bore along a longitudinal axis thereof between an advanced releasing position and a retracted locking position;
   a plurality of engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the spindle; and
   a hydraulically operated actuating sleeve arranged inside the housing, wherein the actuating sleeve is arranged around a peripheral wall of the spindle and slidably mounted to this peripheral wall so as to be axially moveable in relation to the spindle;
   a motion transferring mechanism arranged inside the housing, wherein the motion transferring mechanism is mounted to the spindle and configured to transfer an axial movement of the actuating sleeve in a first axial direction in relation to the spindle into a movement of the drawbar from the advanced releasing position to the retracted locking position; and
   a hydraulic cylinder arrangement arranged inside the housing and configured to move the actuating sleeve axially in relation to the spindle, wherein the hydraulic cylinder arrangement includes a cylinder casing, which is concentric with the actuating sleeve and which is fixed to spindle on the outside thereof so as to be rotatable in relation to the housing together with the spindle, and an annular piston head, which is fixed to or fixedly connected to the actuating sleeve, the piston head being slidably received in an annular space inside the cylinder casing and configured to divide this space into an annular first hydraulic chamber on a first side of the piston head and an annular second hydraulic chamber on an opposite second side of the piston head, wherein the actuating sleeve is moveable together with the piston head in said first axial direction by feeding of hydraulic fluid into the first hydraulic chamber and in an opposite second axial direction by feeding of hydraulic fluid into the second hydraulic chamber, wherein the motion transferring mechanism includes two or more wedges spaced apart in the circumferential direction of the spindle, each wedge being received in a respective aperture that extends radially through said peripheral wall of the spindle, wherein the wedges are configured to press the drawbar towards the retracted locking position when they are pressed radially inwards in the associated apertures wherein each wedge includes a first pressure receiving surface which faces outwards from the spindle, wherein the actuating sleeve on its inner side is provided with a first pressure applying surface which faces inwards for contacting the first pressure receiving surface on each wedge, the first pressure applying surface having a radial distance to the longitudinal axis that increases as seen in said first axial direction and wherein the first pressure applying surface is configured to press each wedge radially inwards in the associated aperture by pressing against the first pressure receiving surface on each wedge when the actuating sleeve is moved in said first axial direction.

2. The clamping device according to claim 1, wherein the spindle and the cylinder casing form part of a rotatable unit that is rotatably received in an inner space of the housing, wherein the first hydraulic chamber is hydraulically connected to a first hydraulic channel in the housing via an annular first hydraulic connecting area at the interface between the housing and said rotatable unit, wherein the second hydraulic chamber is hydraulically connected to a second hydraulic channel in the housing via an annular second hydraulic connecting area at said interface, and wherein a plurality of rotary seals are arranged at said interface on either side of the first hydraulic connecting area and on either side of the second hydraulic connecting area.

3. A The clamping device according to claim 2, wherein each rotary seal is arranged in a respective annular groove arranged in the housing at said interface.

4. The clamping device according to claim 2, wherein each rotary seal includes an inner seal ring and an outer elastomeric O-ring, which surrounds the seal ring and which is arranged in a radially compressed state and configured to press the seal ring against an outer surface of said rotatable unit.

5. The clamping device according to claim 1, wherein the actuating sleeve is configured to assume a self-locking axial position on the spindle when the drawbar has been forced into the retracted locking position under the effect of the actuating sleeve and the motion transferring mechanism, so as to thereby keep the drawbar in the retracted locking position.

6. The clamping device according to claim 1, wherein the piston head forms part of an annular piston member, which is secured to the actuating sleeve.

7. The clamping device according to claim 1, wherein the piston head and the actuating sleeve are formed in one piece.

8. The clamping device according to claim 1, wherein the cylinder casing is fixed to the spindle through a threaded joint formed by an internal thread on the cylinder casing and a corresponding external thread on the spindle.

9. The clamping device according to claim 1, wherein the first pressure applying surface and the first pressure receiving surfaces are inclined in relation to the longitudinal axis by such an angle $\alpha$ that the wedges will keep the actuating sleeve in a self-locking axial position on the spindle when the drawbar has been forced into the retracted locking position under the effect of the actuating sleeve and the wedges.

10. The clamping device according to claim 9, wherein each wedge includes a second pressure receiving surface which faces outwards from the spindle, wherein the actuating sleeve on its inner side is provided with a second pressure applying surface which faces inwards for contacting the second pressure receiving surface on each wedge, the second pressure applying surface having a radial distance to the longitudinal axis that increases as seen in said first axial direction, wherein the second pressure applying surface and the second pressure receiving surfaces are inclined in relation to the longitudinal axis by an angle $\beta$ which is larger than the angle $\alpha$, and wherein the first and second pressure applying surfaces and the first and second pressure receiving surfaces are arranged consecutively on the actuating sleeve and on each wedge, respectively, such that, upon a movement of the actuating sleeve in the first axial direction, the second pressure applying surface is configured to slide and press against the second pressure receiving surface on each wedge during a first phase of the movement and the first pressure applying surface is configured to slide and press against the first pressure receiving surface on each wedge during a subsequent second phase of the movement.

11. The clamping device according to claim 1, wherein the drawbar, under the effect of the actuating sleeve and the motion transferring mechanism, is moveable from the advanced releasing position to the retracted locking position against the action of a spring force from a release spring arranged inside the spindle.

* * * * *